United States Patent [19]

Zumin et al.

[11] 3,923,986
[45] Dec. 2, 1975

[54] NITROGEN CONTAINING ACYCLIC ISOPRENOID COMPOUNDS IN PHARMACEUTICAL COMPOSITIONS

[75] Inventors: Silvia Tricerri Zumin, Como; Mario Riva, Monza, Milan; Giuseppe Iafolla, Milan, all of Italy

[73] Assignee: Pierrel S.p.A., Milan, Italy

[22] Filed: Sept. 18, 1974

[21] Appl. No.: 507,230

Related U.S. Application Data

[60] Division of Ser. No. 345,256, March 27, 1973, Pat. No. 3,875,163, which is a continuation-in-part of Ser. No. 271,067, July 12, 1972, abandoned.

[30] Foreign Application Priority Data

Feb. 21, 1973 United Kingdom................ 9348/73
Feb. 29, 1973 United Kingdom................ 9348/73

[52] U.S. Cl. ............................................. 424/250
[51] Int. Cl.² ...................................... A61K 31/495
[58] Field of Search .................................. 424/250

[56] References Cited
UNITED STATES PATENTS
3,188,313  6/1965  Archer......................... 260/268 BC

*Primary Examiner*—Stanley J. Friedman
*Attorney, Agent, or Firm*—Bacon & Thomas

[57] ABSTRACT

Novel compounds of the formula:

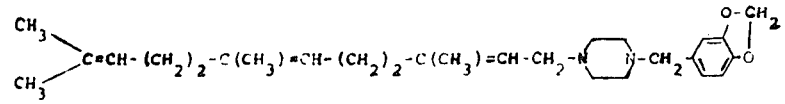

and their pharmaceutically acceptable acid addition salts. The compounds are useful for their analgesic-anti-inflammatory activity and anti-ulcer action. They also inhibit gastric secretion.

13 Claims, No Drawings

NITROGEN CONTAINING ACYCLIC ISOPRENOID COMPOUNDS IN PHARMACEUTICAL COMPOSITIONS

This application is a division of our copending application Ser. No. 345,256, filed on Mar. 27, 1973, and now allowed, as U.S. Pat. No. 3,875,163, which application was a continuation in part of our application Ser. No. 271,067 filed July 12, 1972 and now abandoned.

The present invention relates to novel nitrogen containing acyclic isoprenoid compounds which display remarkable pharmacodynamic activity.

The compounds of the present invention show a low toxicity and a remarkable activity as inhibitors of the gastric secretion; also the anti-ulcer action is very good. Moreover, they show also a spasmolytic action of the papaverinic type, and an analgesic-anti-inflammatory activity. It must also be noted that these products exhibit anti-secretive and anti-ulcer activity in absence of anti-cholinergic properties, proving therefore very interesting from the therapeutical viewpoint.

The compounds of the present invention are represented by the following formula:

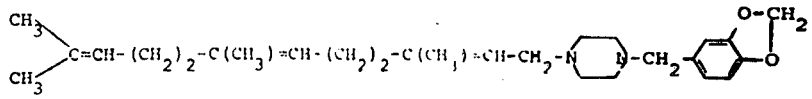

wherein the presence of three double carbon-carbon bonds make possible the existence of geometric isomers with the following possibilities:

a. the sole configuration trans $C_2-C_3$, trans $C_6-C_7$;
b. the sole configuration cis $C_2-C_3$, trans $C_6-C_7$;
c. a mixture of the two above-mentioned geometric isomers of triene;
d. the sole configuration cis $C_2-C_3$, cis $C_6-C_7$;
e. the sole configuration trans $C_2-C_3$, cis $C_6-C_7$;
f. a mixture of the two last mentioned geometric isomers of triene;
g. a mixture of the four mentioned geometric isomers of triene.

The compounds of the present invention (sole isomer or mixture of various isomers, as explained before) are available in the form of free bases or in the form of pharmaceutically acceptable non-toxic acid addition salts thereof, e.g. hydrochlorides, sulphates, acetates, maleates, citrates, etc.

The compounds of the present invention can be prepared by employing various processes and methods already known in the art, some of which can be summarized as follows:

1. A suitable acyclic isoprenoid halide is reacted with a monosubstituted piperazine according to the following scheme, wherein the group

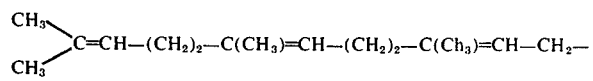

is conventionally indicated as A and

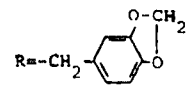

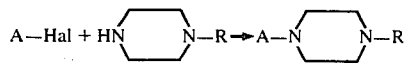

2. A suitable acyclic isoprenoid halide is reacted with piperazinecarboxaldehyde and, after alkaline hydrolysis, the resulting 1-acyclic isoprenoidpiperazine is reacted with a suitable R-halide wherein R has the meaning stated above, according to the following scheme:

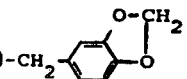

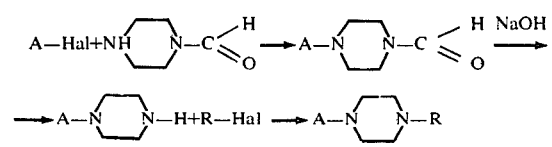

3. A suitable acyclic isoprenoid halide is reacted with p-tosylpiperazine and the resulting sulphonamide is reacted with Na in liquid ammonia to give a secondary amine which, by treatment with a R-halide (R has the meaning stated above) gives the desired product, according to the following scheme:

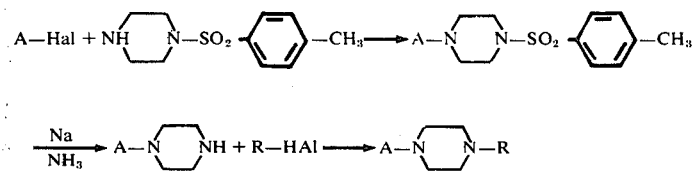

The products of the present invention show, as mentioned above, a remarkable interesting pharmacological activity as will be apparent from the following description, wherein

| | |
|---|---|
| i.p. | = intraperitoneally |
| i.d. | = intraduodenally |
| i.v. | = intravenously |
| p.o. | = per os |
| L.D.$_{50}$ | = Lethal dose 50 |
| E.D.$_{50}$ | = Effective dose 50 |

The acute toxicity on male mice of the tested products was found to be very low and such as to not hinder clinical experimentation. The approximate L.D.$_{50}$ values are reported in the table. Behaviour investigation proved no particular symptomatology at low dosages, whereas at very high dosages, or at the dosages which caused the death of animals, the tested products caused slight convulsions.

With regard to the effects on the isolated organs (segments of Guinea pig ileum) no one of the tested products possesses a remarkable antagonist action either to acetylcholine of histamine. In fact, an inhibiting action was evidenced only with concentrations at least 100 times higher than the ones necessary to obtain an approximate E.D.$_{50}$ with the control substances (atropine sulphate 0,006 γ/ml.; diphenhydramine 0,007 γ/ml.).

On the contrary, the products evidenced a spasmolytic action of the papaverinic type, inhibiting the spasm induced by BaCl$_2$. In this case the concentrations which proved active, are in the same range as evidenced for the specific antagonist (papaverine (1 - 10 γ/ml.).

When administered in cats narcotized with chloralose (80 mg./Kg.i.v.b.w.), even at high dosages (100 mg./Kg.i.d.b.w.), no one of the tested products caused remarkable variations on the blood pressure and breathing. The tested products showed a remarkable activity in inhibiting the gastric secretion on the 4 hrs. Shay test in the rat. The approximate E.D.$_{50}$ by i.d. route are reported in the table. Moreover, the products displayed significant anti-ulcer properties in the various experimental conditions in rat at dosages between 50 and 200 mg./Kg.i.p. (reserpine ulcer, immobilization ulcer, phenylbutazone ulcer and Shay ulcerogenic test).

The products displayed also analgesic and antiinflammatory actions and the active doses proved to be from

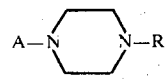

show a very close activity level. It is known, however that atropine-sulphate, at the active dose, shows marked undesired effects of anticholinergic type (mydriasis etc.).

The action of the products according to the present invention remains practically unchanged when administering the products as such, as well as when administering their pharmacologically acceptable non-toxic acid addition salts. The products of the invention may be administered by the same general mode as known for administering the known pharmaceutical compositions, in effective amounts for treatment of the particular condition for which the compounds are active, but with less danger of toxic or undesirable side effects than with the known compositions. They may be prepared in tablet or capsule form, in which a representative dosage unit may be 50 mg., administered once or several times per day. However, smaller or larger dosage units may be prepared as desired, the only reservation being that a reasonable degree of safety before the toxic limit be observed.

The products of this invention also comprise the compounds of their salts, as defined above, in combination with a non-toxic pharmaceutical carrier.

Comparative values of Acute Toxicity and Gastric Antisecretory Activity (Shay test of invention compounds A—N⟨  ⟩N—R, Atropine Sulphate, 2,2'-Bipyridine.

| COMPOUNDS | ACUTE TOXICITY IN MICE LD$_{50}$ (mg./Kg.) | | INHIBITION OF GASTRIC SECRETION IN RATS | |
|---|---|---|---|---|
| | i.p. | p.o. | Volume ED$_{50}$ (mg./Kg. i.d.) | Free acid output ED$_{50}$ (mg./Kg. i.d.) |
| 1) A—N⟨  ⟩N—R | | | | |
| a) trans C$_2$—C$_3$, trans C$_6$—C$_7$ | 300 | | 14 | 9 |
| b) cis C$_2$—C$_3$, trans C$_6$—C$_7$ | 600 | | 26 | 15 |
| c) mixture of a) + b) | 400 | 2000 | 20 | 14 |
| d) cis C$_2$—C$_3$,cis C$_6$—C$_7$ | 500 | | 26 | 15 |
| e) trans C$_2$—C$_3$,cis C$_6$—C$_7$ | 250 | | 10 | 6 |
| f) mixture of d) + e) | 350 | 2000 | 20 | 13 |
| g) mixture of a)—b)+d)+e) | 400 | 2000 | 16 | 9 |
| 2) Atropine Sulphate | 200 | 800 | 2,5 – 5 | 2,5 |
| 3) 2,2'-Bipyridine | 250 | 330 | 10 | 10 |

50 to 200 mg./Kg.p.o. With regard to the anti-cholinergic activity, said products proved to be completely inactive up to doses of 200 mg./Kg.i.p. in the oxotremorine test in the mouse, as well as in the chromodacryorrhea test in the rat.

In the same tests, under the same experimental conditions, atropine sulphate proved to be highly active already at doses of 0.5 – 1 mg./Kg. i.p. b.w.

From the table, it results that the products showing the highest toxicity are 2,2'-bipyridine and atropine-sulphate, whereas the products according to the present invention (indicated as:

A—N⟨  ⟩N—R) show a very low toxicity by oral route.

The most active product is atropine-sulfate, whereas 2,2'-bypyridine and

The following non-limitative Examples illustrate the products and processes of the present invention.

EXAMPLE I

N$^1$-piperonyl-N$^4$-3,7,11-trimethyl-2,6,10-dodecatrienylpiperazine (four isomers mixture)

A solution of 45 mmoles of 1-bromo-3,7,11-trimethyl-2,6,10-dodecatriene (obtained from synthetic farnesol, commercially available and containing four isomers) in 10 ml. of benzene was added dropwise at 0°C to a stirred solution of 45 mmoles of piperonylpiperazine in 60 ml. of benzene containing 5 g. of triethylamine. The mixture was stirred for 2 hours and then the precipitated triethylammonium bromide was filtered off. The benzene solution was washed first with water and then with K$_2$CO$_3$ solution and finally dried (K$_2$CO$_3$). Removal of benzene under reduced pressure gave a crude oily residue which was dissolved in acetone and treated at 5°–8°C with a slight excess of 37%

HCl solution. The precipitated hydrochloride was filtered, washed with acetone and with absolute ethanol. The corresponding base was purified on a silica gel column and the purity of all fractions was checked by thin layer chromatography and gas liquid chromatography. Thin layer chromatography on silica gel gave three spots in the solvent system ethylacetate-petrol ether 1:1. Gas liquid chromatography showed three peaks indicating the presence of four possible isomers. The pure product was a colourless oil: the NMR showed the following signals in δ:

1.55 – 1.80 (m, 12H, $CH_3$-C=), 1.95 - 2.20 (m, 8H, $CH_2$-C=),
2.48 (s, 8H, $CH_2$-N), 3.00 (d, 2H, J=7cps, N-$CH_2$-C=),
3.41 (s, 2H, $CH_2$-arom), 4.90 - 5.50 (m, 3H, CH=C),
5.91 (s, 2H, O-$CH_2$-O), 6 75 – 6.90 (3H, arom).

EXAMPLE II $N^1$-formyl-$N^4$-3,7,11-trimethyl-2,6,10-dodecatrienyl-piperazine (four isomers mixture)

The procedure of Example I was carried out with 45 mmoles of formylpiperazine instead of piperonylpiperazine. The oily residue obtained by evaporation of the benzene solution was chromatographed on silica gel column (elution with chloroformmethanol) to afford the pure base. The NMR showed the following signals in δ:

1.55 – 1.85 (m, 12H, $CH_3$-C=), 1.95 - 2.20 (m, 8H, $CH_2$-C=),
2.30 – 2.60 (m, 4H, $CH_2$-N), 3.00 (d, 2H, J=cps, N-$CH_2$-C=),
3.26 – 3.70 (m, 4H,

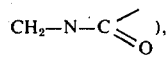

4.95 - 5.45 (m, 3H, CH=C),
8.00 (s, 1H,

EXAMPLE III 3,7,11-trimethyl-2,6,10-dodecatrienylpiperazine (four isomers mixture)

A solution of 47.09 mmoles of the $N^1$-formyl derivative (see Ex. II) in 50 ml. ethanol was refluxed for 20 hours with 7.5 g. of NaOH in 50 ml. water and then the ethanol was evaporated in vacuo. An ethylether extract of the reaction mixture was washed with water, dried ($Na_2SO_4$) and concentrated to an oil, a solution of which was purified on silica gel column. Structure was confirmed by analyses. The NMR showed the following signals in δ:

1.55 – 1.80 (m, 12H, $CH_3$-C=), 1.95 - 2.20 (m, 8H, $CH_2$-C=),
2.30 – 2.60 (m, 4H, $CH_2$-N), 2.42 (s, 1H, N-H),
2.80 – 3.10 (m, 6H, $CH_2$-N), 4.95- 5.50 (m, 3H, CH=C).

EXAMPLE IV $N^1$-piperonyl-$N^4$-3,7,11-trimethyl-2,6,10-dodecatrienylpiperazine (four isomers mixture)

The title compound is prepared condensing 45 mmoles of piperonylchloride with 45 mmoles of 3,7,11-trimethyl,2,6,10-dodecatrienylpiperazine following the procedure described in Example I.

EXAMPLE V $N^1$-tosyl-$N^4$-3,7,11-trimethyl-2,6,10-dodecatrienylpiperazine (four isomers mixture)

To a cold solution (0°C) of 21.6 mmoles of tosylpiperazine in 8ml. of absolute ethanol containing 1.2 g. of anhydrous KOH, 23.8 mmles of 1-bromo-3,7,11-trimethyl-2,6,10-dodecatriene were added dropwise under stirring. The mixture was stirred for 1 hour at room temperature and filtered to remove KBr. Concentration of the solution gave a crude oily residue which was treated with 5 percent KOH, extracted with methylene dichloride, washed with water and dried ($K_2CO_3$). Evaporation to dryness in vacuo gave an oil which was chromatographed on silica gel using ethylacetate-petrol ether as eluants. Ir (neat) 1345 ($\nu$ $SO_2$) and 1160 $cm^{-1}$ ($\nu$ $SO_2$).

EXAMPLE VI 3,7,11-trimethyl-2,6,10-dodecatrienylpiperazine (four isomers mixture)

A solution of 4.9 mmoles of the tosyl derivative in 10 ml. of toluene was slowly added to 100 ml. of liquid ammonia and the resulting suspension was treated with about 250 mg. (10.9 mg.-atoms) of sodium in small portions until a deep blue colour persisted for 15 min. Then 1.0 g. of ammonium chloride was added in one portion and the blue colour was immediately discharged. The mixture was stirred for additional 10 min. and then 100 ml. of toluene were added dropwise allowing ammonia to evaporate over a 2 hours period. The organic solution was washed with water, dried ($K_2CO_3$) and concentrated under reduced pressure. Purification by chromatography over silica gel (chloroformmethanol eluants) afforded the pure base. For NMR signals see Example III.

EXAMPLE VII $N^1$-piperonyl-$N^4$-3,7,11-trimethyl-2,6,10-dodecatrienylpiperazine (cis $C_2$-$C_3$, trans $C_6$-$C_7$)

10.5 ml. of anhydrous pyridine are added to a solution of 100 g. (0.45 moles) of commercially available pure transnerolidol in 300 ml. petroleum ether and then, under stirring and maintaining the temperature between —5° and —10°C, a solution of 53 g. (0.2 moles) of $PBr_3$ in 70 ml. petroleum ether are added thereto. When the addition is completed, stirring is maintained for 2 hours at —2°-to 0°C. then the solution is washed first with water-ice up to neutrality, and then with cold saturated $NaHCO_3$ solution. After drying on $Na_2SO_4$ and then on anhydrous $K_2CO_3$, the solvent is eliminated and the remaining oil is treated with 100 ml. benzene. The so obtained solution (1-bromo-3,7,11-trimethyl-2,6,10-dodecatriene) is added under stirring at 0°C to a solution of 99 g. (0.45 moles) of N-piperonylpiperazine dissolved in 600 ml. of benzene containing 50 g. of triethylamine. When the addition is completed, stirring is maintained for 2 hours then the precipitated triethylammonium bromide is filtered off and the solution is washed first with water and then with $K_2CO_3$ solution and finally dried. Afterwards, the solvent is evaporated under vacuum and the oily residue is dissolved in acetone and treated with a slight excess of 37 percent aqueous HCl, maintaining the temperature below +10°C. The precipitated hydrochloride is filtered, washed with acetone and with absolute ethanol. The corresponding base is the expected mixture of the two isomers cis $C_2$–$C_3$, trans $C_6$–$C_7$ and trans $C_2$–$C_3$, trans $C_6$–$C_7$. Chromatography of 15 g. of the product on 3 Kg. Silica gel (160 × 9.5 cm. column), using 25 percent benzene in ethylacetate as eluant, resulted in complete separation of the two isomers. The first eluted product is the pure cis $C_2$–$C_3$, trans $C_6$–$C_7$ isomer. Thin layer chromatography on silica gel gave one spot in the system benzene-ethylacetate 25:75. Gas liquid chromatography showed only one peak on OV 17 —5 percent on Chromosorb G AW-DMCS 80–100 mesh, 6 m. lenght, 1.6 mm. inlet diameter.

EXAMPLE VIII $N^1$-piperonyl-$N^4$-3,7,11-trimethyl-2,6,10-dodecatrienylpiperazine (trans $C_2$–$C_3$, trans $C_6$–$C_7$)

After separation of the pure isomer cis $C_2$–$C_3$, trans $C_6$–$C_7$ of Example VII, some fractions are obtained which contain the isomer mixture. At the end, the pure isomer trans $C_2$–$C_3$, trans $C_6$–$C_7$ is eluted. Thin layer chromatography on silica gel gave one spot in the system benzene-ethylacetate 25:75. Gas liquid chromatography showed only one peak.

EXAMPLE IX $N^1$-piperonyl-$N^4$-3,7,11-trimethyl-2,6,10-dodecatrienylpiperazine (cis $C_2$–$C_3$, cis $C_6$–$C_7$)

The procedure of Example VII is carried out with 0.45 moles of cis-nerolidol (from commercially available mixture of cis and trans-nerolidols; the separation was achieved on 5 percent silver nitrate impregnated silica gel column with benzeneethylacetate 70:30 as eluant). The obtained base is the expected mixture of the two isomers cis $C_2$–$C_3$, cis $C_6$–$C_7$ and trans $C_2$–$C_3$, cis $C_6$–$C_7$. After chromatography as in Example VII, the first eluted product is the pure cis $C_2$–$C_3$, cis $C_6$–$C_7$ isomer, as showed by thin layer chromatography and gas liquid chromatography.

EXAMPLE X $N^1$-piperonyl-$N^4$-3,7,11-trimethyl-2,6,10-dodecatrienylpiperazine (trans $C_2$–$C_3$, cis $C_6$–$C_7$)

After separation of the pure isomer cis $C_2$–$C_3$, cis $C_6$–$C_7$ of Example IX, some fractions are obtained which contain the isomer mixture. At the end, the pure isomer trans $C_2$–$C_3$, cis $C_6$–$C_7$ is eluted. Thin layer chromatography on silica gel gave one spot in the system benzene-ethylacetate 25:75. Gas liquid chromatography showed only one peak.

EXAMPLE XI

Preparation of 1000 tablets, each containing 50 mg. of the active substance

| | | |
|---|---|---|
| $N^1$-piperonyl-$N^4$-3,7,11-trimethyl-2,6,10--dodecatrienylpiperazine | g. | 50 |
| Colloidal silicic acid | g. | 150 |
| Starch | g. | 150 |
| Lactose | g. | 40 |
| Talc | g. | 8 |
| Magnesium Stearate | g. | 2 |

PROCEDURE

The active substance is dissolved in ethanol and the resulting solution is adsorbed by colloidal silicic acid using a suitable mixer. The mixture is dried in an oven under vacuum at 40°C. Starch, lactose and the half of the lubricants are added to the dried mixture which, after accurate mixing, is compressed in slugs which are afterwards granulated. The remaining quantity of lubricants is added to the obtained granulate and the mixture is then compressed into tablets of 400 mg., each containing 50 mg. of active substance.

EXAMPLE XII

Preparation of enteric-coated tablets.

The ingredients and the procedures described in Example XI are used. At the end, the tablets are covered with a cellulose acetophtalate-film.

EXAMPLE XIII

Preparation of 1000 tablets of soft-gelatine capsules, each containing 50 mg. of active substance.

| | | |
|---|---|---|
| $N^1$-piperonyl-$N^4$-3,7,11-trimethyl-2,6,10--dodecatrienylpiperazine | g. | 50 |
| Vegetable oil | g. | 70 |

PROCEDURE

The active substance and the vegetable oil are homogeneously mixed proceeding thereafter to the preparation of Scherer type capsules. Each capsule contains 50 mg. of active substance.

EXAMPLE XIV

Gastro-resistant solf-gelatine capsules.

The same ingredients and procedures of Example XIII are used. The capsules, at the end, undergo a treatment with formalin in order to obtain gastro-resistance.

What we claim is:

1. A pharmaceutical composition in dosage unit form containing an effective gastric antisecretory, anti-ulcer, analgesic of anti-inflammatory amount of a compound selected from the group consisting of $N^1$-piperonyl-$N^4$-3,7,11-trimethyl-2,6,10-dodecatrienylpiperazine and a therapeutically acceptable non-toxic salt thereof and a non-toxic pharmaceutically acceptable carrier therefor.

2. The composition of claim 1 wherein the compound is the trans $C_2$–$C_3$, trans $C_6$–$C_7$ isomer.

3. The composition of claim 1 wherein the compound is the cis $C_2$–$C_3$, trans $C_6$–$C_7$ isomer.

4. The composition of claim 1 wherein the compound is the cis $C_2$–$C_3$, cis $C_6$–$C_7$ isomer.

5. The composition of claim 1 wherein the compound is the trans $C_2$–$C_3$, cis $C_6$–$C_7$ isomer.

6. The composition of claim 1 wherein the compound is a mixture of the isomer trans $C_2$–$C_3$, trans $C_6$–$C_7$ and cis $C_2$–$C_3$, trans $C_6$–$C_7$.

7. The composition of claim 1 wherein the compound is a mixture of the isomers cis $C_2$–$C_3$, cis $C_6$–$C_7$ and trans $C_2$–$C_3$, cis $C_6$–$C_7$.

8. The composition of claim 1 wherein the compound is a mixture of the isomers trans $C_2$–$C_3$, trans $C_6$–$C_7$; cis $C_2$–$C_3$, trans $C_6$–$C_7$; cis $C_2$–$C_3$, cis $C_6$–$C_7$; trans $C_2$–$C_3$, cis $C_6$–$C_7$.

9. The composition of claim 1 wherein the dosage unit form is a tablet.

10. The composition of claim 1 wherein the dosage unit form is a capsule.

11. The composition of claim 1 wherein the dosage unit form is a gastro-resistant capsule.

12. The composition of claim 1 wherein the dosage unit contains approximately 50 to 200 mg. of the compound.

13. A pharmaceutical composition in dosage unit form possessing gastric antisecretory and anti-ulcer activity comprising $N^1$-piperonyl-$N^4$-3,7,11-trimethyl-2,6,10-dodecatrienylpiperazine and a non-toxic pharmaceutical carrier therefor.

* * * * *